(12) United States Patent
Doyle

(10) Patent No.: US 10,888,876 B2
(45) Date of Patent: Jan. 12, 2021

(54) VALVE

(71) Applicant: Weir Minerals Australia Ltd., Artarmon (AU)

(72) Inventor: Mark Doyle, Artarmon (AU)

(73) Assignee: WEIR MINERALS AUSTRALIA LTD

( * ) Notice: Subject to any disclaimer, the term of this patent is extended or adjusted under 35 U.S.C. 154(b) by 169 days.

(21) Appl. No.: 16/081,846

(22) PCT Filed: Dec. 28, 2016

(86) PCT No.: PCT/AU2016/051295
§ 371 (c)(1),
(2) Date: Aug. 31, 2018

(87) PCT Pub. No.: WO2017/152214
PCT Pub. Date: Sep. 14, 2017

(65) Prior Publication Data
US 2020/0164386 A1    May 28, 2020

(30) Foreign Application Priority Data
Mar. 9, 2016   (AU) ................................ 2016900874

(51) Int. Cl.
*B03D 1/14* (2006.01)
*B03D 1/02* (2006.01)
B03D 1/20 (2006.01)
B03D 1/24 (2006.01)
*F16K 11/04* (2006.01)

(52) U.S. Cl.
CPC ............ *B03D 1/028* (2013.01); *B03D 1/1462* (2013.01); *B03D 1/021* (2013.01); B03D 1/20 (2013.01); B03D 1/24 (2013.01); B03D 2201/02 (2013.01); B03D 2203/02 (2013.01); F16K 11/04 (2013.01)

(58) Field of Classification Search
CPC ........ B03D 1/028; B03D 1/1462; B03D 1/24; B03D 2201/02; B03D 1/20; B03D 2203/02; B03D 1/021; F16K 11/04
USPC ......................................................... 209/168
See application file for complete search history.

(56) References Cited

U.S. PATENT DOCUMENTS 2,179,622 A    11/1939  Garrett
6,935,367 B2    8/2005  Cook et al.
(Continued)

FOREIGN PATENT DOCUMENTS

CN    203743507 U    7/2014

OTHER PUBLICATIONS

International Preliminary Report on Patentability for PCT/AU2016/051295 dated Jan. 18, 2018, 8 pgs.
(Continued)

*Primary Examiner* — Thomas M Lithgow
(74) *Attorney, Agent, or Firm* — Foley & Lardner LLP

(57) ABSTRACT

A valve for use in controlling fluid flow in a flotation processing circuit is described, the valve including: a valve body; an inlet to the valve body; an outlet from the valve body; a member which is arranged in use to control fluid flow from the inlet to the outlet; and wherein the valve also comprises a bypass opening which facilitates fluid flow in one or both of two modes: in the first mode from the inlet to the bypass opening; and in the second mode from the bypass opening to the outlet.

13 Claims, 8 Drawing Sheets

(56) References Cited

U.S. PATENT DOCUMENTS

2010/0263752 A1* 10/2010 Young .................. B03D 1/14
                                                        137/571
2011/0048695 A1   3/2011 Cherewyk et al.

OTHER PUBLICATIONS

International Search Report for PCT/AU2016/051295 dated Mar. 1, 2017, 4 pgs.
Written Opinion of the International Search Authority for PCT/AU2016/051295 dated Mar. 1, 2017, 4 pgs.

* cited by examiner

VALVE

CROSS REFERENCE TO RELATED APPLICATION

This application is a National Stage Entry of, claims priority to, and claims the benefit of International Patent Cooperation Treaty (PCT) Application Serial No. PCT/AU2016/051295 entitled "A Valve" and filed on 28 Dec. 2016, which is incorporated herein by reference in its entirety for any purpose.

TECHNICAL FIELD

This disclosure relates in general to flotation processing circuits and to an improved dart valve for use in such circuits, and to improved methods of operation of such circuits.

BACKGROUND OF THE DISCLOSURE

Froth flotation is a process for separating minerals from gangue by taking advantage of differences in their hydrophobicity. Hydrophobicity differences between valuable minerals and waste gangue are increased through the use of surfactants and wetting agents. The selective separation of the minerals makes processing complex ores economically feasible. The flotation process is used for the separation of a large range of sulfides, carbonates and oxides prior to further refinement. Phosphates and coal are also upgraded (purified) by flotation technology.

Before froth flotation can work, the ore to be treated is reduced to fine particles by crushing and grinding (a process known as comminution) so that the various minerals exist as physically separate grains. This process is known as liberation. The particle sizes are typically less than 0.1 mm (100 µm), but sometimes sizes smaller than 7-10 µm are required. There is a tendency for the liberation size of the minerals to decrease over time as the ore bodies with coarse mineral grains that can be separated at larger sizes are depleted and replaced by ore bodies that were formerly considered too difficult. In the mining industry, the plants where flotation is undertaken to concentrate ore are generally known as concentrators or mills.

For froth flotation, the ground ore is mixed with water to form a slurry and the desired mineral is rendered hydrophobic by the addition of a surfactant or collector chemical. The particular chemical depends on the nature of the mineral to be recovered and, perhaps, the natures of those that are not wanted. This slurry of hydrophobic particles and hydrophilic particles is then introduced to tanks known as flotation cells that are aerated to produce bubbles. The hydrophobic particles attach to the air bubbles, which rise to the surface, forming a froth. The froth is removed from the cell, producing a concentrate of the target mineral Numerous flotation cells are usually provided in a flotation circuit. The slurry flows sequentially from one cell to the next. In each cell froth is removed and the slurry continues to the next cell for continued processing to maximise the recovery of the target mineral. After roughing, cleaning and scavenging stages, the remnants of the processed slurry is discarded as tailings.

Referring to FIG. 1, a typical roughing stage flotation circuit 10 is shown which includes eight flotation cells 12. The slurry is introduced at cell 12a and makes its way through the series of cells to cell 12g. The passage of slurry from one cell to the next is controlled by a series of dart valves 14, 16. The slurry flow out of each of cells 12a to 12g is controlled by a pair of left 14 and right 16 dart valves.

Each dart valve 14, 16 includes an inlet which is plumbed to the outlet of a cell and an outlet which is plumbed to the inlet of the next cell. A valve member in the dart valve cooperates with a valve seat. An actuator moves the valve member to control the rate of flow of slurry though the valve, and hence from one cell to the next. The valves 14, 16 are used in pairs between adjacent cells to achieve a suitably high flow rate and to provide some redundancy to protect against valve blockage or other failure. The flow from cell 12a to 12b is controlled by left dart valve 14a and right dart valve 16a. The flow from cell 12b to 12c is controlled by left dart valve 14b and right dart valve 16b and so on to cell 12h. The flow out of cell 12h is controlled by a single dart valve.

Over time, the flotation cells 12 or their associated aeration, agitation and froth removal systems become worn due to the corrosive and abrasive nature of the slurry. In the event that one of the cells requires maintenance it is necessary to shut down the entire circuit of cells to gain access to the particular cell. This downtime has an associated cost of lost production. Furthermore, the shutdown of the circuit causes knock-on disruption to processing stages occurring before or after the froth separation stage in the mill.

SUMMARY

In a first aspect, there is provided a valve for use in controlling fluid flow in a flotation processing circuit, the valve including: a valve body; an inlet to the valve body; an outlet from the valve body; a member which is arranged in use to control fluid flow from the inlet to the outlet; and wherein the valve also comprises a bypass opening which facilitates fluid flow in one or both of two modes: in the first mode from the inlet to the bypass opening; and in the second mode from the bypass opening to the outlet.

In certain embodiments, the member is arranged to control fluid flow from the inlet to the bypass opening.

In certain embodiments, the valve further includes isolation valves which are associated with each of the outlet, inlet and bypass openings.

In certain embodiments, the valve further includes a valve seat which cooperates with the member; the valve seat and the member are part of a sub-assembly which is arranged to be withdrawn from the valve body.

In certain embodiments, the valve seat is compressed against the valve body to seal against the valve body by means of a spacing arrangement which extends from the valve seat to an end region of the valve body.

In certain embodiments, the valve member is mounted on a shaft by way of an aperture provided in the valve member which surrounds the shaft and the valve member is assembled onto the shaft by passing the upper end of the shaft through the aperture in the valve member.

In certain embodiments, the valve further includes an overflow discharge opening which allows overflow of fluid or foam from the pump body to the outlet.

In certain embodiments, the valve member is located at a position below the valve seat and is pulled upwards to seal against the valve seat.

In certain embodiments, the valve is a dart valve.

In a second aspect there is provided a flotation processing circuit including: first and second flotation cells arranged in use to have a first configuration in which: at least one first valve according to the first aspect controls fluid flow from the first cell to the second flotation cell; and at least one second valve according to the first aspect controls fluid flow from the second flotation cell; and wherein in a second configuration, the bypass openings of each of the at least one first and second valves are utilized to bypass the second flotation cell.

In certain embodiments, the body of the first valve extends upwards to a height greater than the level of fluid which the first cell is arranged to contain.

In a third aspect there is provided a method of isolating the second flotation cell in a flotation processing circuit according to the second aspect including the steps of: isolating the outlet of the first valve from the second cell; isolating the inlet of the second valve from the second cell; and putting the bypass opening of the first valve in fluid communication with the bypass opening of the second valve.

In certain embodiments, the bypass opening of the first valve is put in fluid communication with the bypass opening of the second valve by way of a hose or pipe.

In certain embodiments, the step of putting the bypass opening of the first valve in fluid communication with the bypass opening of the second valve includes the step of opening isolation valves associated with the bypass openings of the first and second valves.

In a fourth aspect there is provided a method of retrofitting a flotation processing circuit including the steps of: replacing one or more valves in the flotation processing circuit with valves according to the first aspect.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

An improved dart valve 20, which can be substituted for the dart valves 14, 16 shown in FIG. 1, will now be described with reference to FIGS. 2 to 7. Dart valve 20 is universal insofar as it can be substituted for either of the left hand 14 or right hand 16 versions of dart valve shown in FIG. 1. For ease of understanding, the dart valve 20 will be described below as a substitute for the left hand 14 dart valves of FIG. 1.

Figure 2:
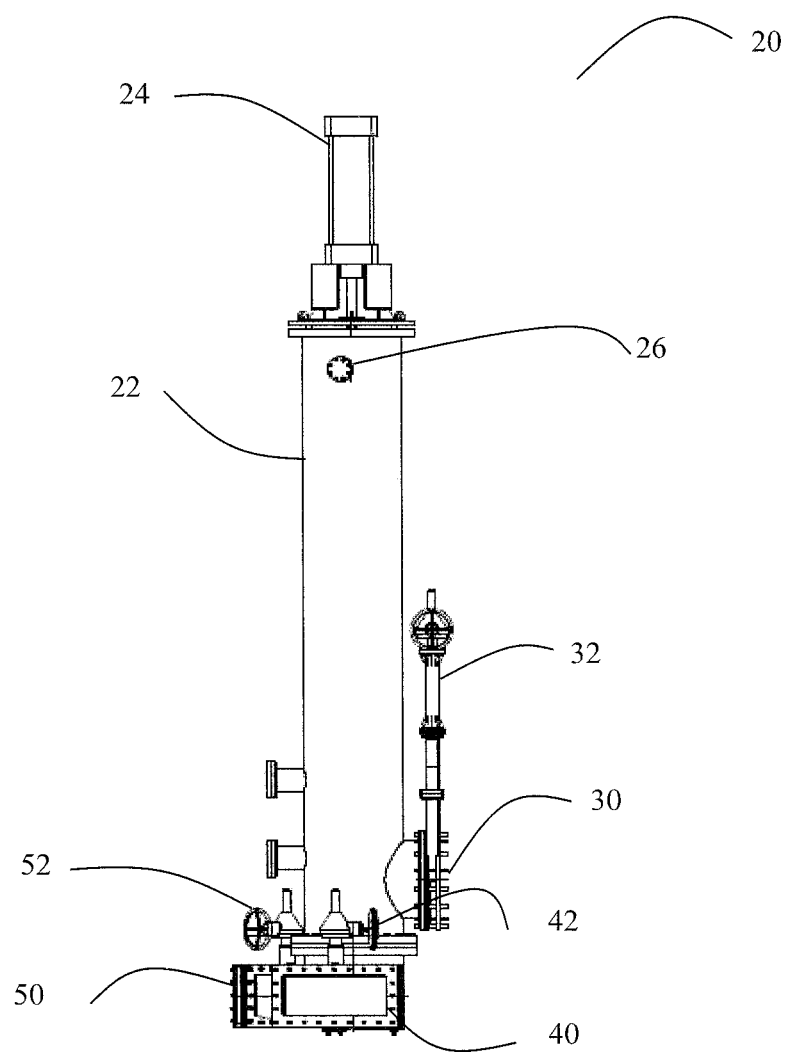
FIG. 2 is a front view of a valve in accordance with this disclosure.
Figure 3:
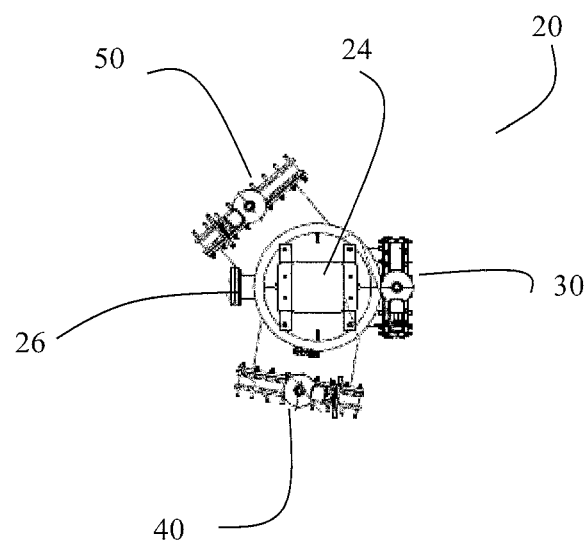
FIG. 3 is a top view of the valve of FIG. 2.
Figure 4:
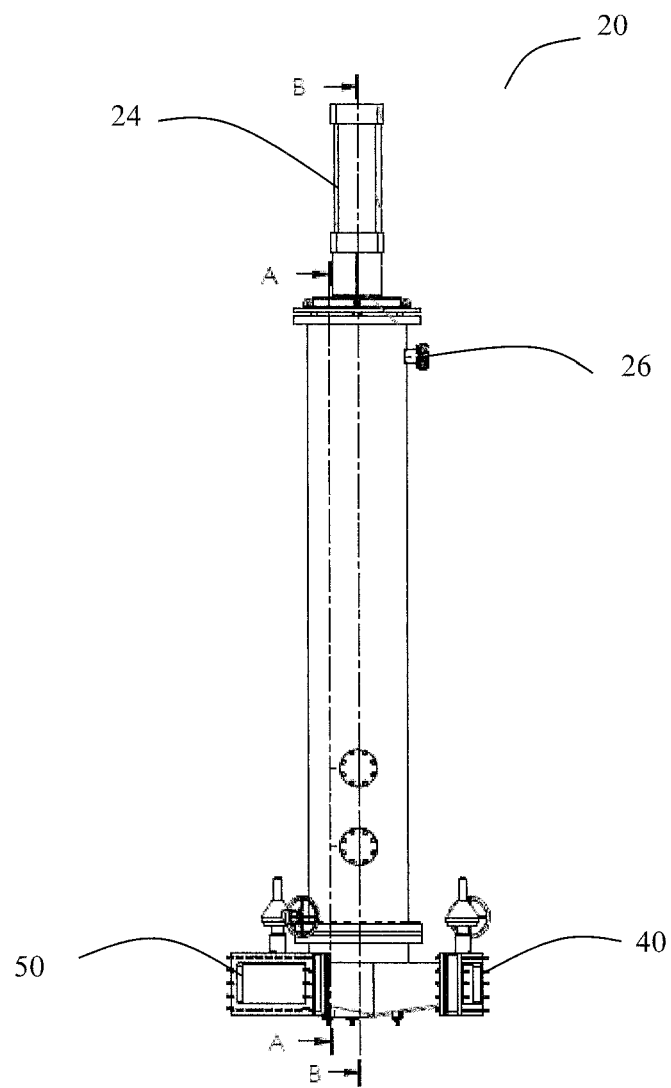
FIG. 4 is side view of the valve of FIG. 2.

Referring to FIG. 2, the dart valve 20 includes a valve body in the form of a cylindrical valve case 22. There is an inlet to the valve case 22 in the form of an inlet port 30, an outlet to the valve case in the form of an outlet port 40 and a bypass opening to the valve case 20 in the form of a bypass port 50. A member in the form of valve member 64 (best seen in FIG. 6) cooperates with a valve seat 66. The valve member 64 is mounted on a shaft 60 which is coupled to a pneumatic actuator 24. Movement of the actuator 24 controls the longitudinal position of the shaft 60 and the valve member 64 in relation to the valve seat 66 to thereby control the flow of fluid slurry during use of the dart valve 20, and to permit flow from the inlet 30 to the outlet 40. The actuator 24 is fitted with an IP67 rated electro-pneumatic programmable positioner to give infinite valve position over the full stroke.

Manually operated and lockable isolation valves in the form of gate valves 32, 42 and 52 are associated with each of the inlet port 30, the outlet port 40 and the bypass port 50 of the dart valve 20. The isolation valves 32, 42 and 52 and the bypass port 50 can be used to circumvent any of the cells in a flotation circuit as will be later described with reference to FIG. 8.

Figure 5:
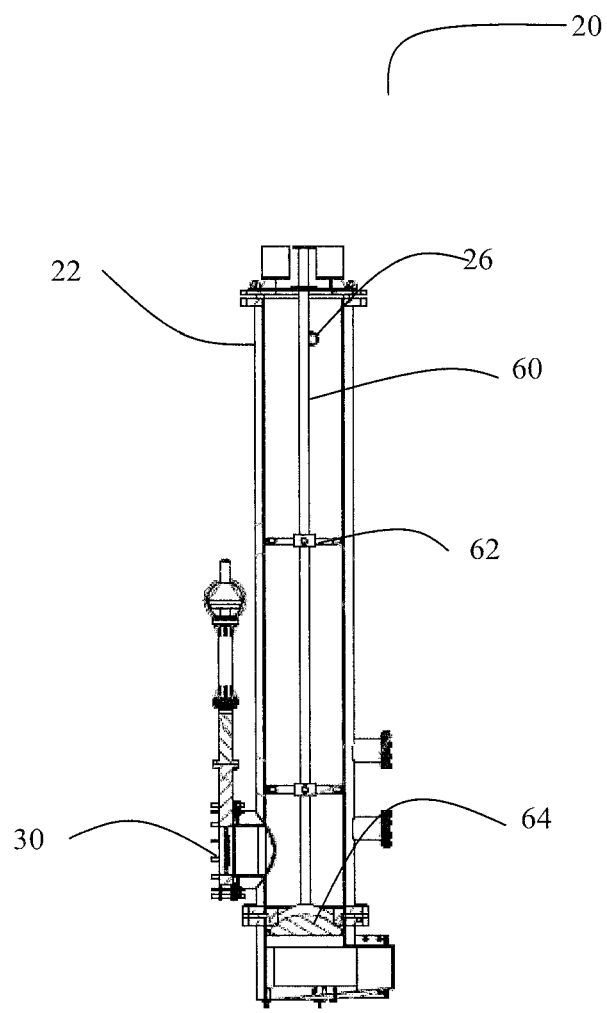
FIG. 5 is a cross sectional view along the line A-A of FIG. 4.
Figure 6:
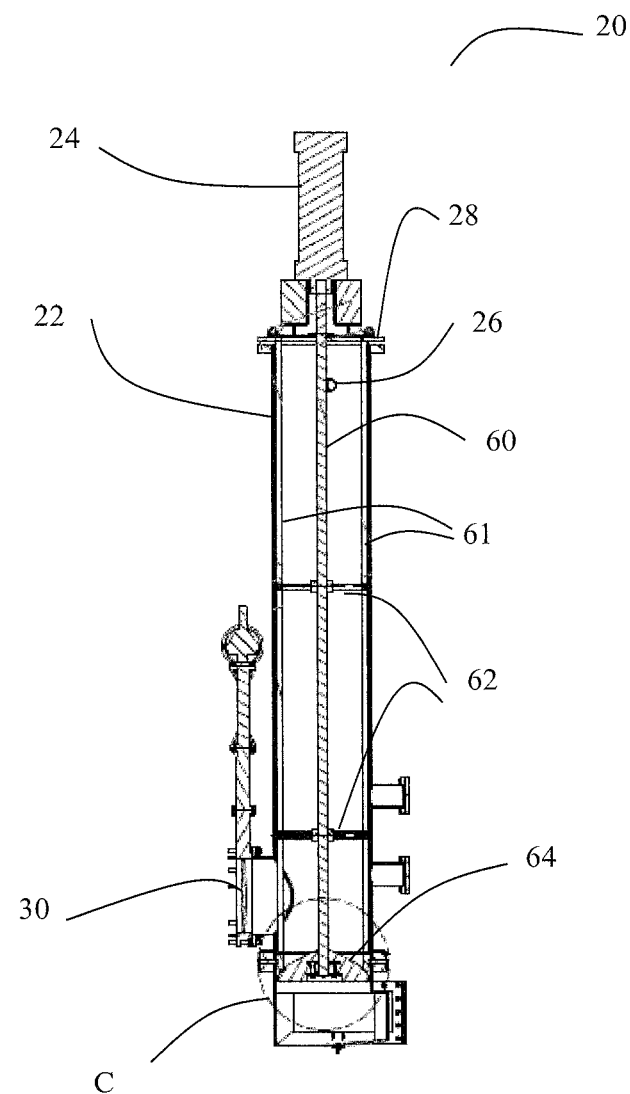
FIG. 6 is a cross sectional view along the line B-B of FIG. 4.
Figure 7:
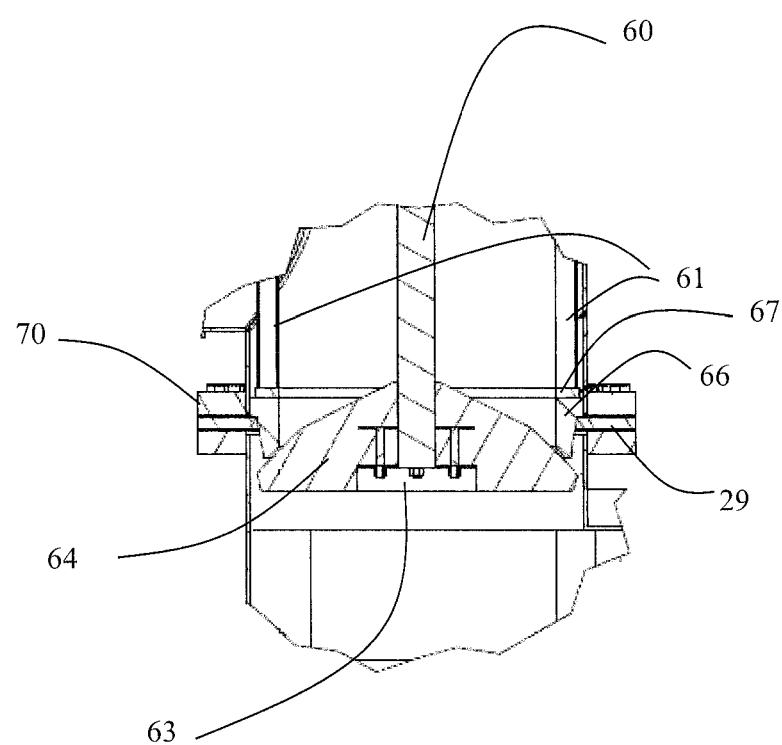
FIG. 7 is an enlarged view of Detail C of FIG. 6.

Referring now to FIGS. 5, 6 and 7, the valve member 64 and valve seat 66 are provided in a sub-assembly comprising the valve member 64 mounted on the shaft 60. The shaft 60 is inserted through laterally positioned shaft guides 62, which are centrally located in a cage formed from four equally circumferentially-spaced legs 61. The legs 61 bear against a cage lower ring 67 to which is mounted the valve seat 66.

The legs 61 function as a spacing arrangement and extend from the cage lower ring 67 to the underside of the top cover 28 of the dart valve 20. By tightening some circumferentially spaced bolts which secure the top cover 28 in place, force is transmitted by the legs 61 to bear against the cage lower ring 67 and in turn to compress the valve seat 66 against cage seat ring 29 of the valve body 22. Adjustment of the circumferentially spaced bolts ensures the cage is fully seated and adjusted to set the compression.

The cage is a fully welded four-post design with radiating spoke and peripheral ribs. The cage is designed to minimise weight whilst giving extreme rigidity and torsional and longitudinal strength. The cage has three sets of peripheral ribs and transverse spokes to stop squat under actuation loads, and to prevent torsional movement which may be induced by the flow of slurry in the lower sections of the valve in use.

When the valve top cover 28 is removed, the entire sub-assembly of cage legs 61, valve member 64 and valve seat 66 can be removed from the case 22 of the dart valve 20. A new sub-assembly can then be slidingly installed in place of a worn sub-assembly, to enable rapid replacement of valve parts.

As shown in FIGS. 6 and 7, the valve member 64 is located at a position below the valve seat 66 and is pulled upwards to seal against the valve seat 66. The arrangement for affixing the valve member 64 to the shaft 60 has been devised to guard against the possibility of the valve member 64 becoming detached from the end of the shaft 60. Referring to FIG. 7, a flange 63 is welded to the end of the shaft 60. The valve member 64 includes a central aperture and is assembled onto the shaft 60 by passing the upper end of the shaft 60 through the aperture in the valve member 64 so that the valve member 64 surrounds the shaft 60 and then allowing the valve member 64 to slide down the shaft to abut against the flange 63. Downwardly directed studs in the valve member 64 are arranged to pass through apertures in the flange 63 and are secured from below by affixing nuts which also secure in place a polyurethane cover to protect the nuts and stud from wear due to contact with slurry in use.

Importantly, because flange 63 is welded in position to the shaft 60, the valve member 64 is not removable from the lower end of the shaft 60.

The shaft 60 is coated with a Linatex® rubber coating. The valve member 64 is formed from polyurethane moulded over a steel reinforcing core. The valve seat 66 is formed from Linatex® rubber. The internal body parts of the dart valve 20 are all lined with Linatex®.

The valve 20 further includes an overflow discharge opening 26 which can be plumbed to the outlet 40 of the valve to allow overflow of fluid or foam inside the valve body to escape to the outlet 40.

The valve 20 is dimensioned so that its body is of such a height that it extends upwards to a height greater than the level of fluid which an associated flotation cell is arranged to contain. In this way, the level of fluid in the valve 20 cannot reach the uppermost region of the valve where the shaft 60 passes through the valve top cover 28. This obviates the need for a sealing arrangement, such as a gland seal, to seal between the shaft 60 and the valve top cover 28 and obviates the need to maintain or inspect such a sealing arrangement.

Figure 1:
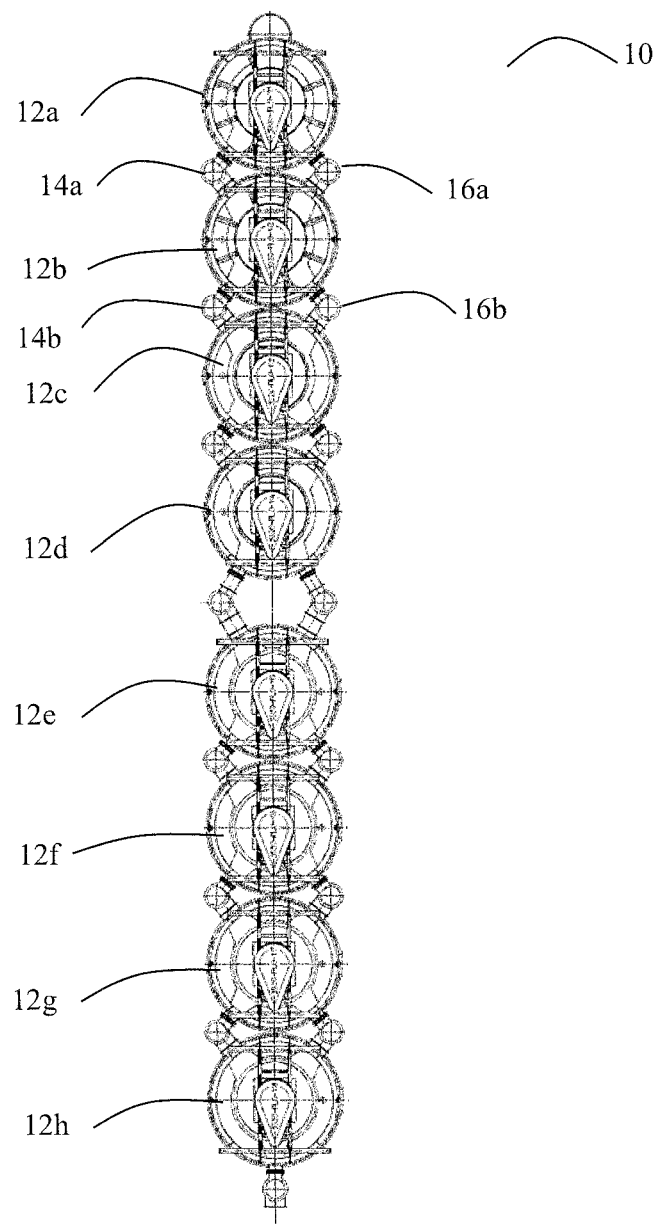
FIG. 1 is a schematic top view of a prior art flotation circuit.
Figure 8:
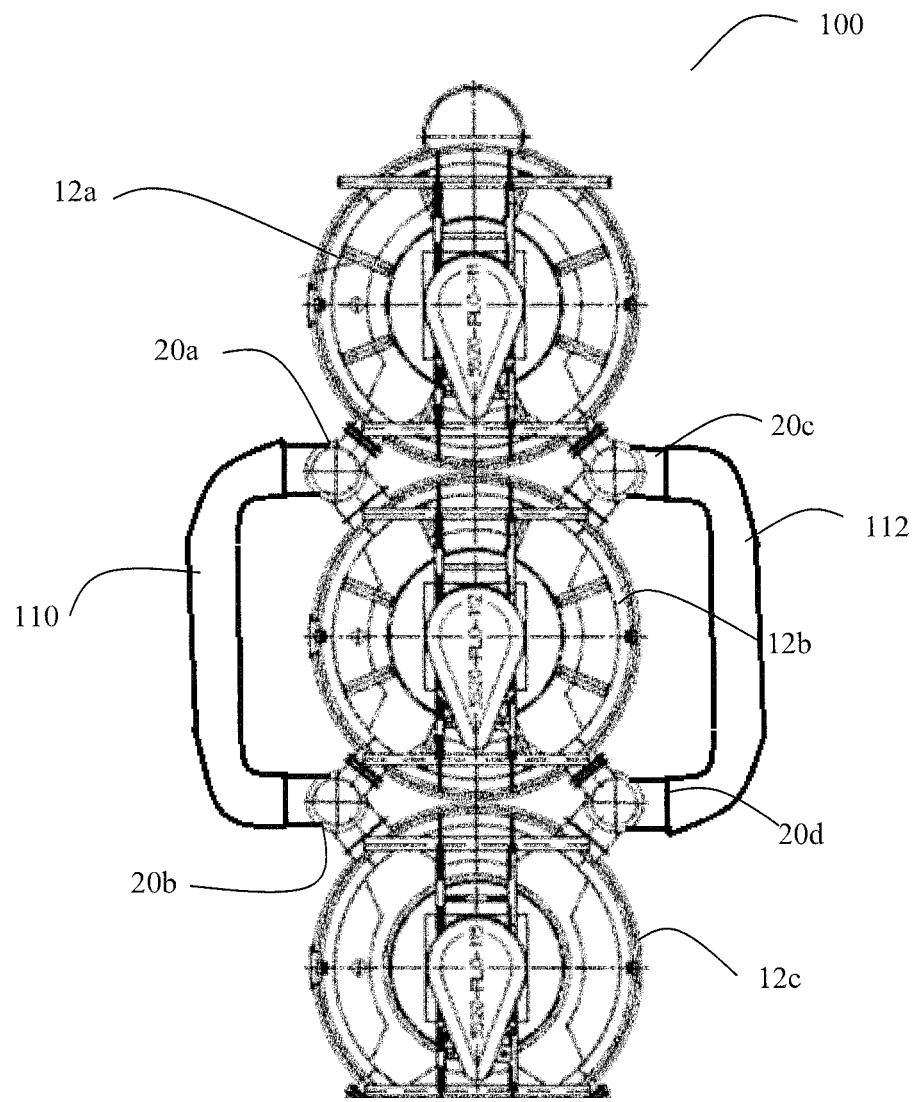
FIG. 8 is a top view of a flotation circuit including dart valves in accordance with this disclosure.

Referring to FIG. 8, a modified flotation circuit based on FIG. 1 is shown. The dart valves 14, 16 have been replaced with dart valves 20 according to the present disclosure. In normal operation, the flotation circuit operates in a first configuration in which valves 20a, 20c control fluid flow from the first cell 12a to the second cell 12b, and valves 20b, 20d control flow from the second cell 12b to the third cell 12c.

In this example, it has been determined that maintenance work must be carried out on cell 12b. The circuit can therefore be put into a second configuration wherein the bypass ports of valves 20a, 20b, 20c and 20d are utilized to bypass the second cell 12b.

The circuit 100 is put into the second configuration by carrying out a sequence of operations as follows:
1. Isolate the outlet 40 of valve 20a from cell 12b by closing gate valve 42;
2. Isolate the inlet 30 of valve 20b from cell 12b by closing gate valve 32;
3. Putting the bypass port of valve 20a in fluid communication with the bypass port of valve 20b by joining the bypass ports with a length of hose 110 of suitable diameter and opening the gate valves 52 of both valves 20a, 20b.

The same procedure as above is carried out in relation to valves 20c and 20d, to join their bypass ports with a similar hose 112.

As can be seen in FIG. 8, in the second configuration, the flotation cell 12b is circumvented. In a dual bypass situation, slurry flows out of cell 12a under control of valves 20a and 20c. The slurry then flows out of the bypass openings of valves 20a, 20c and through the hoses 110, 112, and then into the bypass ports of valves 20b, 20d and through the outlet ports of valves 20b, 20d, flowing into cell 12c. The valves 20b, 20d play no part in regulating fluid flow in this configuration. In this configuration of dart valves 20, maintenance can be carried out on cell 12b and on the valves 20b, 20d whilst the remainder of the circuit continues to operate in its usual fashion.

The hose 110, 112 may be connected to the valve 20 by way of an elbow adaptor. The elbow can be mounted on the bypass opening of a valve facing either uphill or downhill to eliminate hose kinking.

The hose 110, 112 may be formed as a fabric reinforced hose and may require external moveable supports from one cell to the next to minimise stress at the hose to elbow/valve connection.

More than one cell can be bypassed at any time simply by increasing the hose length and following the same procedure explained above. If more than one cell is bypassed at a time, then the valves associated with some of the bypassed cells can act as drain valves.

As a result of its design, the valve is easily cleaned by being hosed out in the event of bogging or blocking since the access through the top of the valve is maintained.

The outlet and bypass ports of the valve are located on a bonnet, which is secured to the main upright part of the valve body by way of a flange joint (labelled 70 in FIG. 7) which is secured with a number of bolts. The inlet port is located on the main valve body. The angle between the inlet and outlet ports can be changed by temporarily removing the bolts at the flange 70 where the bonnet joins the main body, rotating the main body with respect to the bonnet to the desired position, and re-installing the bolts.

The valve can be configured with single valve member as described above or it could also be made with a double seat in one valve, if flow rates or space limitations mean that a valve needs to be fitted to one side of the cells only, or if the valve is fitted between the cells.

The valve can be fitted as described above or if space limitations do not allow the valve body shown, then a stilling tube shaft support can be supplied—also eliminating the need for a gland but precluding the pull out cage.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A dart valve for use in controlling fluid flow in a flotation processing circuit, the valve comprising:
   a valve body;
   an inlet to the valve body;
   an outlet from the valve body;
   a member which is arranged in use to control fluid flow from the inlet to the outlet;
   a bypass opening which facilitates fluid flow in one or both of two modes:
   (i) in the first mode from the inlet to the bypass opening; and
   (ii) in the second mode from the bypass opening to the outlet; and
   isolation valves which are associated with each of the outlet, inlet, and bypass opening.

2. The dart valve according to claim 1, wherein the member is arranged to control fluid flow from the inlet to the bypass opening.

3. The dart valve according to claim 1, further including a valve seat which cooperates with the member; the valve seat and the member are part of a sub-assembly which is arranged to be withdrawn from the valve body.

4. The dart valve according to claim 1, wherein the valve seat is compressed against the valve body to seal against the valve body by means of a spacing arrangement which extends from the valve seat to an end region of the valve body.

5. The dart valve according to claim 1, wherein the valve member is mounted on a shaft by way of an aperture provided in the valve member which surrounds the shaft and the valve member is assembled onto the shaft by passing the upper end of the shaft through the aperture in the valve member.

6. The dart valve according claim 1, which further includes an overflow discharge opening which allows overflow of fluid or foam from the pump body to the outlet.

7. The dart valve according to claim 1, wherein the valve member is located at a position below the valve seat and is pulled upwards to seal against the valve seat.

8. A flotation processing circuit including:
   first and second flotation cells arranged in use to have a first configuration in which:
   at least one first valve according to claim 1 controls fluid flow from the first cell to the second flotation cell; and
   at least one second valve according to claim 1 controls fluid flow from the second flotation cell; and
   wherein in a second configuration, the bypass openings of each of the at least one first and second valves are utilized to bypass the second flotation cell.

9. The flotation processing circuit according to claim 8, wherein the body of the first valve extends upwards to a height greater than the level of fluid which the first cell is arranged to contain.

10. A method of isolating the second flotation cell in a flotation processing circuit according to claim 8, the method comprising:
    isolating the outlet of the first valve from the second cell;
    isolating the inlet of the second valve from the second cell; and
    putting the bypass opening of the first valve in fluid communication with the bypass opening of the second valve.

11. The method according to claim 10, wherein the bypass opening of the first valve is put in fluid communication with the bypass opening of the second valve by way of a hose or pipe.

12. The method according to claim 10, wherein the step of putting the bypass opening of the first valve in fluid communication with the bypass opening of the second valve includes the step of opening isolation valves associated with the bypass openings of the first and second valves.

13. A method of retrofitting a flotation processing circuit comprising:
    replacing one or more valves in the flotation processing circuit with a dart valve comprising:
    a valve body;
    an inlet to the valve body;
    an outlet from the valve body;
    a member which is arranged in use to control fluid flow from the inlet to the outlet;
    a bypass opening which facilitates fluid flow in one or both of two modes:
    (i) in the first mode from the inlet to the bypass opening; and
    (ii) in the second mode from the bypass opening to the outlet; and
    isolation valves which are associated with each of the outlet, inlet, and bypass opening.

* * * * *